United States Patent
Aldana

(10) Patent No.: US 11,671,189 B2
(45) Date of Patent: Jun. 6, 2023

(54) SYSTEMS AND METHODS FOR MANAGING ENERGY DETECTION THRESHOLDS

(71) Applicant: META PLATFORMS TECHNOLOGIES, LLC, Menlo Park, CA (US)

(72) Inventor: Carlos Horacio Aldana, Mountain View, CA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 124 days.

(21) Appl. No.: 17/135,226

(22) Filed: Dec. 28, 2020

(65) Prior Publication Data
US 2022/0094454 A1    Mar. 24, 2022

Related U.S. Application Data

(60) Provisional application No. 63/082,285, filed on Sep. 23, 2020.

(51) Int. Cl.
*H04B 17/309* (2015.01)
*H04W 74/08* (2009.01)

(52) U.S. Cl.
CPC ................... *H04B 17/309* (2015.01)

(58) Field of Classification Search
None
See application file for complete search history.

(56) References Cited

U.S. PATENT DOCUMENTS

| | | | | |
|---|---|---|---|---|
| 10,257,859 | B1* | 4/2019 | Chu | H04W 74/0808 |
| 2011/0124333 | A1* | 5/2011 | Lotze | H04W 16/14 |
| | | | | 455/434 |
| 2011/0263211 | A1* | 10/2011 | Perthold | H04B 17/382 |
| | | | | 455/67.13 |
| 2017/0086206 | A1* | 3/2017 | Wang | H04W 72/542 |
| 2017/0353975 | A1* | 12/2017 | Khawer | H04W 8/005 |
| 2018/0220379 | A1* | 8/2018 | Zhang | H04W 72/0473 |
| 2018/0317170 | A1* | 11/2018 | Cariou | H04W 72/23 |
| 2019/0165861 | A1* | 5/2019 | Tibuleac | H04B 10/2942 |
| 2020/0344013 | A1* | 10/2020 | Seely | H04W 52/20 |
| 2021/0014873 | A1* | 1/2021 | Akhtar | H04W 52/50 |
| 2021/0067976 | A1* | 3/2021 | Cariou | H04W 16/14 |
| 2021/0307065 | A1* | 9/2021 | Xue | H04W 16/14 |

* cited by examiner

*Primary Examiner* — Duc T Duong
(74) *Attorney, Agent, or Firm* — Foley & Lardner LLP

(57) ABSTRACT

Disclosed herein includes a system, a method, and a device for managing energy detection thresholds. A device can perform an energy detection (ED) measurement of a channel, comparing against a defined ED threshold function, so as to determine if the channel is occupied. The device can perform a measurement of a channel indicative of a power level of signals detected in the channel. The device can compare the measurement to a threshold having a value that is a continuous monotonic function having a sloped region between a first region having a first constant value and a second region having a second constant value. The sloped region can include a function of a maximum transmit power of the device and at least one of the first constant value or the second constant value. The device can determine, responsive to the comparison, whether the channel is occupied or unoccupied.

17 Claims, 8 Drawing Sheets

SYSTEMS AND METHODS FOR MANAGING ENERGY DETECTION THRESHOLDS

CROSS-REFERENCE TO RELATED APPLICATION

This application claims priority to U.S. Provisional Patent Application No. 63/082,285, filed Sep. 23, 2020, which is incorporated by reference in its entirety for all purposes.

FIELD OF DISCLOSURE

The present disclosure is generally related to communications, including but not limited to managing energy detection thresholds.

BACKGROUND

Artificial reality such as a virtual reality (VR), an augmented reality (AR), or a mixed reality (MR) provides immersive experience to a user. In one example, a user wearing a head wearable display (HWD) can experience artificial reality (e.g., a VR space, an AR space, or a MR space). In one implementation, an image of a virtual object is generated by a console (e.g., as an access point) communicatively coupled or tethered to the HWD (e.g., as a mobile terminal). In some setups, the console may have access to a wireless channel or network and the HWD can access the network via wirelessly connecting with the console device.

SUMMARY

Devices, systems and methods for managing energy detection thresholds are described herein. A device (e.g., mobile terminal, user equipment, access point, or base station) can perform an energy detection (ED) measurement of a channel, comparing against a defined ED threshold function, so as to determine if the channel is occupied. The threshold function can include a mathematically defined energy detection threshold that forms a continuous monotonic function and has a specific sloped region in between two flat regions. The sloped region can be a function of at least a flat region threshold and maximum transmit power value(s) of a device monitoring a channel (instead of a defined/fixed threshold value). The device can apply a transmit power of a device to a selected threshold function to determine a value for the ED threshold and compare the ED threshold to a measured power level of the channel to determine the status of the channel.

In at least one aspect, a method is provided. The method can include performing, by a device, a measurement of a channel indicative of a power level of one or more signals detected in the channel. The method can include comparing, by the device, the measurement to a threshold having a value that is a continuous monotonic function having a sloped region between a first region having a first constant value and a second region having a second constant value. The sloped region can include a function of a maximum transmit power of the device and at least one of the first constant value or the second constant value. The method can include determining, by the device responsive to the comparison, whether the channel is occupied or unoccupied.

In embodiments, the method can include determining, by the device responsive to the power level being greater than the threshold, that the channel is occupied and unavailable for the device to access for communications. The method can include determining, by the device responsive to the power level being less than the threshold, that the channel is unoccupied and available for the device to access for communications. The method can include determining, by the device, the threshold according to the function of the sloped region, when the maximum transmit power of the device is within a range of the sloped region. The method can include determining, by the device, that the threshold is the first constant value when the maximum transmit power of the device is within a first range of the first region, and that the threshold is the second constant value when the maximum transmit power of the device is within a second range of the second region.

In embodiments, the first region can cover a first range of power levels and the second region can cover a second range of power levels, and the sloped region can have a gradient that is inversely proportional to a difference between a first value and a second value. The first value can be an upper limit of the first range and the second value can be a lower limit of the second range. In embodiments, a gradient of the sloped region can be a constant value. The continuous monotonic function can include a second sloped region between the second region having the second constant value and a third region having a third constant value. The second region can cover a first range of power levels and the third region can cover a second range of power levels. The second sloped region can have a gradient that is inversely proportional to a difference between a first value and a second value. The first value can be an upper limit of the first range and the second value can be a lower limit of the second range.

In embodiments, the device can include a very low power (VLP) device and the device can be within a range of other VLP devices, and the method can include setting the value of the threshold as a function of a product of the maximum transmit power of the device and a first threshold, and a product of the maximum transmit power of the device and a second threshold.

In at least one aspect, a device is provided. The device can include one or more one or more processors. The one or more processors can be configured to perform a measurement of a channel indicative of a power level of one or more signals detected in the channel. The one or more processors can be configured to compare the measurement to a threshold having a value that is a continuous monotonic function having a sloped region between a first region having a first constant value and a second region having a second constant value. The sloped region can include a function of a maximum transmit power of the device and at least one of the first constant value or the second constant value. The one or more processors can be configured to determine, responsive to the comparison, whether the channel is occupied or unoccupied.

The one or more processors can be configured to determine, responsive to the power level being greater than the threshold, that the channel is occupied and unavailable for the device to access for communications. The one or more processors can be configured to determine, responsive to the power level being less than the threshold, that the channel is unoccupied and available for the device to access for communications. The one or more processors can be configured to determine the threshold according to the function of the sloped region, when the maximum transmit power of the device is within a range of the sloped region.

In embodiments, the one or more processors can be configured to determine that the threshold is the first constant value when the maximum transmit power of the device is within a first range of the first region, and that the threshold is the second constant value when the maximum transmit power of the device is within a second range of the second region. In embodiments, the first region can cover a first range of power levels and the second region can cover a second range of power levels, and the sloped region can have a gradient that is inversely proportional to a difference between a first value and a second value. The first value can be an upper limit of the first range and the second value is a lower limit of the second range.

In embodiments, a gradient of the sloped region can be a constant value. The continuous monotonic function can include a second sloped region between the second region having the second constant value and a third region having a third constant value. The second region can cover a first range of power levels and the third region can cover a second range of power levels. The second sloped region can have a gradient that is inversely proportional to a difference between a first value and a second value. The first value can be an upper limit of the first range and the second value is a lower limit of the second range. The device can include at least one of a mobile terminal, user equipment or device, access point or base station.

In at least one aspect, a non-transitory computer readable medium storing instructions is provided. The non-transitory computer readable medium can store instructions that when executed by one or more processors cause the one or more processors to perform a measurement of a channel indicative of a power level of one or more signals detected in the channel. The non-transitory computer readable medium can store instructions that when executed by one or more processors cause the one or more processors to compare the measurement to a threshold having a value that is a continuous monotonic function having a sloped region between a first region having a first constant value and a second region having a second constant value. The sloped region can include a function of a maximum transmit power of the device and at least one of the first constant value or the second constant value. The non-transitory computer readable medium can store instructions that when executed by one or more processors cause the one or more processors to determine, responsive to the comparison, whether the channel is occupied or unoccupied. In embodiments, the first region can cover a first range of power levels and the second region can cover a second range of power levels, and the sloped region can have a gradient that is inversely proportional to a difference between a first value and a second value. The first value can be an upper limit of the first range and the second value can be a lower limit of the second range.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1A:
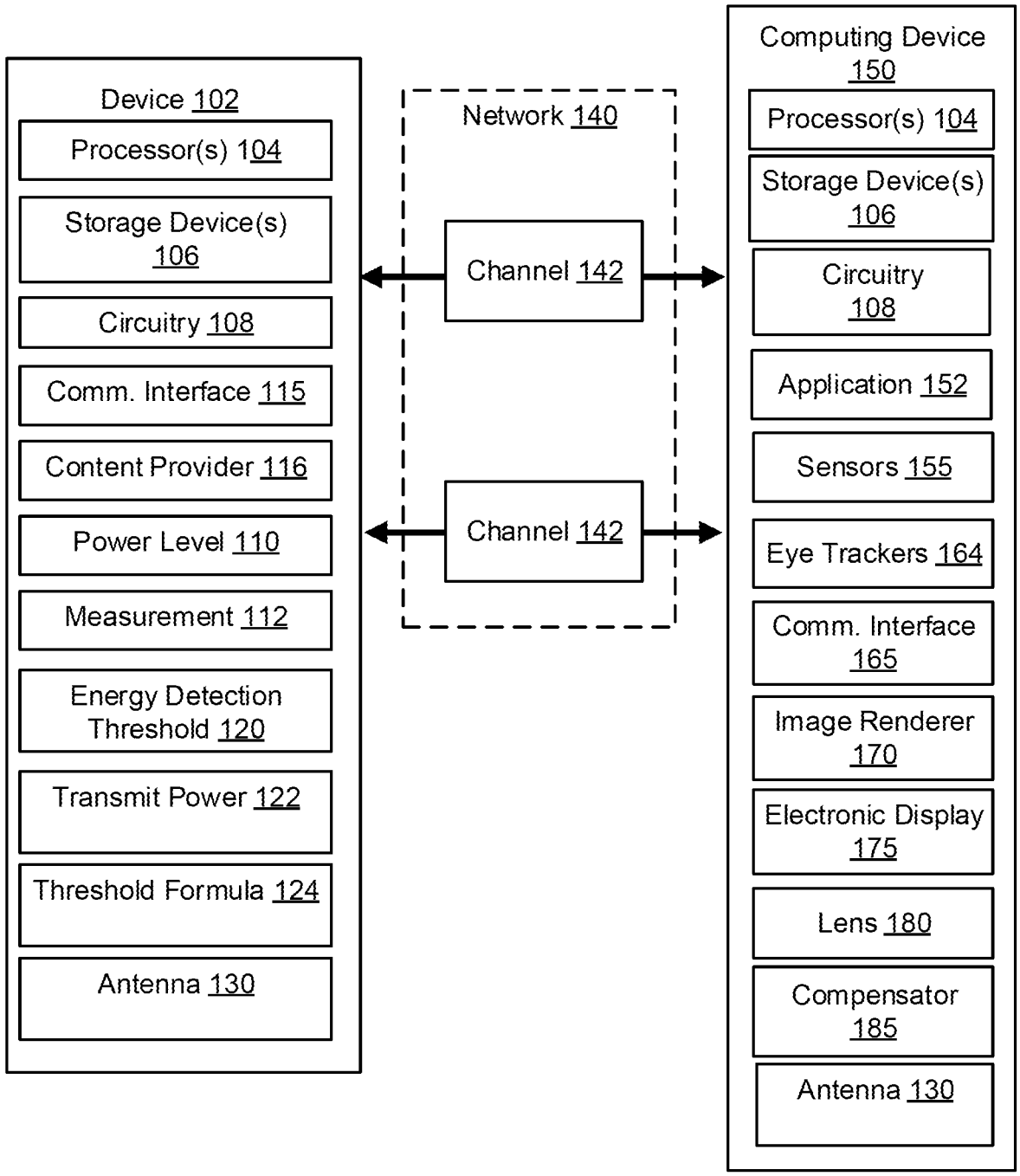
FIG. 1A is a diagram of a system for managing energy detection thresholds, according to an example implementation of the present disclosure.

The subject matter of the present disclosure is directed to techniques for managing energy detection thresholds. A device (e.g., mobile terminal, user equipment, access point, or base station) can perform an energy detection (ED) measurement of a channel, comparing against a defined ED threshold function, so as to determine if the channel is occupied. In some embodiments, the threshold function includes a mathematically defined energy detection thresholds that form a continuous monotonic function that has a specific sloped region in between two flat regions. The sloped region can be a function of at least a flat region threshold and maximum transmit power value(s) of a device monitoring a channel (instead of defined/fixed values). In some embodiments, the variable energy detection thresholds can optimally address different applications (e.g., to allow user simulations to specify the optimal threshold for at least some maximum transmit power values, to then drive the design/configuration of the ED threshold function). These aspects can be applicable to both the mobile terminal side and base station side, and is also applicable to all wireless protocols in the shared unlicensed spectrum (e.g., WiFi, cellular/5G, ultra wideband, etc.).

Each year the number of mobile devices connected to wireless networks significantly increases, and changes can be made to system parameters or requirements to be able to meet the increased demands. For example, the changes can include, but are not limited to, a larger bandwidth, a lower latency, and higher data rates. One of the limiting factors in wireless innovation can be the availability of spectrum. To mitigate this, the availability of spectrum for unlicensed use can be an attractive proposition. In April 2020, the FCC in the United States adopted rules that make 1200 MHz of spectrum in the 6 GHz band (5.925-7.125 GHz) available. In Europe, the rules for 6 GHz operation can be found in ETSI EN 303687: 6 GHz RLAN, Harmonised Standard for access to radio spectrum.

The unlicensed spectrum has been an interest to expand the availability of LTE. In embodiments, one of the major enhancements for LTE in 3GPP Release 13 can be to enable its operation in the unlicensed spectrum via Licensed-Assisted Access (LAA), which expands the system bandwidth by utilizing the flexible carrier aggregation (CA)

framework introduced by the LTE-Advanced system. 3GPP launched 5G NR Release 15 and then followed that with Release 16 that provided NR-U, which provides for or allows for 5G NR support operating in unlicensed spectrum. In 3GPP Release 16, the rules for channel access in unlicensed spectrum can be found in 3GPP TS 37.213.

In ETSI EN 303687, there currently exists ambiguity as to how the thresholds should be chosen. The systems, methods, devices and techniques described herein provide multiple options to determine, select and utilize energy detection thresholds. The energy detection threshold can include a constant value or a varying value that is a function of a maximum transmit power of a device where a channel measurement occurs, a type of device (e.g., VLP device, non-VLP device) and/or properties of the network the channel is communicating through. A device executes a single ED threshold calculation that depends on its maximum output power. The device can use the ED threshold and one or more channel measurements to determine a status of the channel. In embodiments, a channel can include an occupied channel as long as transmissions in that channel are present at a power level greater than the energy detection threshold (EDT). The power level can be determined by integrating the received power over the channel, and then normalized to per MHz transmit power. The received power can be measured at the interface between the equipment and the antenna assembly. In some embodiments, if no transmissions are present at a power level greater than the energy detection threshold, the channel can be designated as an unoccupied channel.

The systems, methods, devices and techniques described herein can apply to or used by various types of communications including communications between access points (AP) devices and a plurality of station devices. An AP device can determine a status of a channel for one or more STA devices, for example, tor the STA devices to communicate to the AP device and/or for the STA devices to communicate with other STA devices. The energy detection threshold techniques described herein can be applied to applications, including but not limited to, augmented reality (AR) applications and/or virtual reality (VR) applications.

Referring now to FIG. 1A, a system 100 for managing energy detection thresholds 120 is depicted. In brief overview, the system 100 can include a device 102 (e.g., access point, base station, mobile terminal, user equipment, station device) determining a status of one or more channels 142 for communicating with one or more other devices 102 (e.g., access point, base station, mobile terminal, user equipment, station device) in a network 140. Before transmitting, device 102 can perform an energy detection measurement 112 of a channel 142, compare the measurement 112 against a defined energy detection (ED) threshold 120 function to, for example, determine if the channel is occupied or unoccupied. The device 102 can compute an ED threshold 120 that depends on its maximum configured transmit power.

The device 102 can include a transmitting device (e.g., transmitting transmissions via a channel 142), an access point (e.g., wireless access point), a base station, a mobile terminal, user equipment, or station device. In embodiments, the methods and techniques described herein for managing energy detection thresholds can be applied or executed by both a base station side and/or a mobile terminal side and the device 102 can include a device on either side of communications through the network 140.

In embodiments, device 102 may provide a wireless network 140 or connect one or more computing devices 150 (e.g., wireless devices) to a wireless network 140. In embodiments, the device 102 can include a networking hardware device to create a wireless network 140 or provide connections to a wireless network 140. In some embodiments, the device 102 can project a Wi-Fi signal to a designated area to create a wireless network 140 or provide connections to a wireless network 140. The designated area may include a designated neighborhood, basic service area (BSA) or basic service set (BSS). The device 102 can connect to a router or be provided as a component of a router for connecting one or more computing devices 150 to the wireless network 140. The wireless network 140 can include, but is not limited to a Wireless Local Area Network (WLAN)), a Local Area Network (LAN), a Wide Area Network (WAN), a Personal Area Network (PAN), company Intranet or the Internet through a variety of wireless or cellular connections. The wireless network 140 can include a public network, private network or a combination of a private network and a public network.

The device 102 can include or correspond to a console providing content of artificial reality to one or more computing devices 150 (e.g., head wearable display (HWD 150)). The device 102 can determine a view within the space of the artificial reality corresponding to the detected location and the gaze direction, and generate an image depicting the determined view. The device 102 may provide the image to a computing device 150 (e.g., HWD) for rendering. In some embodiments, the system 100 can include or correspond to an artificial reality system environment that includes more, fewer, or different components than shown in FIG. 1A. In some embodiments, functionality of one or more components of the artificial reality system environment 100 can be distributed among the components in a different manner than is described here. For example, some of the functionality of the computing device 150 (e.g., console) may be performed by one or more wireless devices (e.g., HWDs). For example, some of the functionality of the computing devices 150 (e.g., HWD) may be performed by the device 102 (e.g., console).

The device 102 can include a processor 104. The processor 104 can include any logic, circuitry and/or processing component (e.g., a microprocessor) for pre-processing input data for the device 102, and/or for post-processing output data for the device 102. The one or more processors 104 can provide logic, circuitry, processing component and/or functionality for configuring, controlling and/or managing one or more operations of the device 102. For instance, a processor 104 may receive data and metrics, including but not limited to, power levels 110, measurements 112, ED thresholds 120, and/or transmit power values 122. In some embodiments, the processors 104 can include or correspond to a driver or host driver of the device 102 to execute or perform one or more portions of the processes or methods (e.g., method 400) described herein. The processor 104 can be the same as or similar to processing units 516 described above with respect to FIG. 5.

The device 102 can include a storage device 106. The storage device 106 can include a static random access memory (SRAM) or any other types of memory, storage drive or storage register. The storage device 106 can include a static random access memory (SRAM) or internal SRAM, internal to the device 102. In some embodiments, the storage device 106 can be included within an integrated circuit of the device 102. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 400) described herein. In some embodiments, the storage device 106 can include, be the same as or substantially similar to storage 518 of FIG. 5. The device 102 can include circuitry 108. The circuitry 108 can be a component of or part of computing system 514 described with respect to FIG. 5. In embodiments, the circuitry 108 can include a processor to perform all of or parts of method 400 described with respect to FIG. 4.

In some embodiments, the device 102 is an electronic component or a combination of an electronic component and a software component that provides content to be rendered to one or more computing devices 150. In one aspect, the device 102 includes a communication interface 115 and a content provider 116. These components may operate together to determine a view (e.g., a FOV of the user) of the artificial reality corresponding to the location of a computing device 150 and the gaze direction of the user of the computing device 150, and can generate an image of the artificial reality corresponding to the determined view. In other embodiments, the device 102 includes more, fewer, or different components than shown in FIG. 1A. In some embodiments, the device 102 is integrated as part of the computing device 150. In some embodiments, the communication interface 115 is an electronic component or a combination of an electronic component and a software component that communicates with the computing device 150. The communication interface 115 may be a counterpart component to the communication interface 165 to communicate with a communication interface 115 of the device 102 through a communication link (e.g., USB cable) or communication channel. Through the communication channel, the communication interface 115 may receive from the computing device 150 sensor measurements indicating the determined location and orientation of the computing device 150 and/or the determined gaze direction of the user. Moreover, through the communication channel, the communication interface 115 may transmit to the computing device 150 data describing an image to be rendered.

The content provider 116 is a component that generates content to be rendered according to the location and orientation of the computing device 150 and/or the gaze direction of the user of the computing device 150. In one aspect, the content provider 116 determines a view of the artificial reality according to the location and orientation of the computing device 150 and/or the gaze direction of the user of the computing device 150. For example, the content provider 116 maps the location of the computing device 150 in a physical space to a location within an artificial reality space, and determines a view of the artificial reality space along a direction corresponding to an orientation of the computing device 150 and/or the gaze direction of the user from the mapped location in the artificial reality space. The content provider 116 may generate image data describing an image of the determined view of the artificial reality space, and transmit the image data to the computing device 150 through the communication interface 115. In some embodiments, the content provider 116 generates metadata including motion vector information, depth information, edge information, object information, etc., associated with the image, and transmits the metadata with the image data to the computing device 150 through the communication interface 115. The content provider 116 may encode the data describing the image, and can transmit the encoded data to the computing device 150. In some embodiments, the content provider 116 generates and provides the image to the computing device 150 periodically (e.g., every one second).

The device 102 can determine or perform one or more measurements 112 to measure a power level 110 of one or more channels 142. The power level 110 can include or correspond to a received power over a channel 142, a power level of one or more signals received through the channel 142 and/or a level of transmissions received through the channel 142. In embodiments, the power level 110 can include or correspond to a received power over a channel 142 normalized to a per megahertz (MHz) power value. In some embodiments, the device 102 can perform the measurement 112 at an interface between the device 102 and an antenna assembly 130 of the device (e.g., between receiving equipment and antenna assembly).

The device 102 can execute or apply one or more ED thresholds 120 to determine a status of a channel 142. The ED threshold 120 can include a function that varies or is configurable based in part on a maximum transmit power 122 of the device 102 performing the measurement 112. The ED thresholds 120 as described herein can include functions having multiple regions to provide a varying value for the ED threshold 120 to monitor a status of a channel 142, for example, instead of applying a fixed or static threshold value. The device can include or maintain a plurality of threshold functions 124 to determine an ED threshold 120. The threshold functions 124 can include continuous monotonic functions having one more flat regions and/or one or more sloped regions that generate or provide an ED threshold 120 based in part on a maximum transmit power 122 of a device 102, one or more constant values, and/or one or more power thresholds. The device 102 can select at least one threshold function 124 to determine a value for an ED threshold 120 and can apply the maximum transmit power 122 of the respective device 102 to the selected threshold function 124 to determine the value for the ED threshold 120. The device 102 can have different properties including a maximum transmit power 122 (e.g., also referred to herein as transmit power, $P_H$). The maximum transmit power 122 can represent a configured maximum transmit capability of the device 102 and can be proportional to an effective range of the device 102 to transmit one or more signals over network 140.

The computing device 150 can include a station (STA) device having the capability to use the 802.11 protocols. The computing device 150 can include a mobile terminal, user equipment, access point, wireless device and/or base station. In embodiments, the computing device 150 can include a client device, head wearable device (HWD), computing system or WiFi device. In some embodiments, the computing device 150 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The computing device 150 can be implemented as, include, or be part of a head mounted display (HMD), head mounted device (HMD), head wearable device (HWD), head worn display (HWD) or head worn device (HWD). The computing device 150 can be implemented to provide VR, augmented reality (AR), and/or mixed reality (MR) experience to a user (e.g., wearing the display) of the computing device 150 or connected to the computing device 150. In some embodiments, the computing device 150 can include conventional, specialized or custom computer components such as processors 104, a storage device 106, a network interface, a user input device, and/or a user output device. In embodiments, the computing device 150 may include some elements of the HWD 150 shown in FIG. 2. In embodiments, the computing device 150 can provide or host one or more applications 152. The applications 152 can include, but are not limited to, a virtual reality (VR) application 152, an augmented reality (AR) application 152, or a mixed reality (MR) application 152.

In some embodiments, the computing device 150 (e.g., HWD) is an electronic component that can be worn by a user and can present or provide an artificial reality experience to the user. The computing device 150 may render one or more images, video, audio, or some combination thereof to provide the artificial reality experience to the user. In some embodiments, audio is presented via an external device (e.g., speakers and/or headphones) that receives audio information from the computing device 150, the device 102, or both, and presents audio based on the audio information. In some embodiments, the computing device 150 includes sensors 155, eye trackers 164, a communication interface 165, an image renderer 170, an electronic display 175, a lens 180, and a compensator 185. These components may operate together to detect a location of the computing device 150 and/or a gaze direction of the user wearing the computing device 150, and render an image of a view within the artificial reality corresponding to the detected location of the computing device 150 and/or the gaze direction of the user. In other embodiments, the computing device 150 includes more, fewer, or different components than shown in FIG. 1A.

The computing device 150 can include one or more processors 104. The one or more processors 104 can include any logic, circuitry and/or processing component (e.g., a microprocessor) for pre-processing input data for transmissions to the device 102 and/or another computing device 150, and/or for post-processing output data for the device 102 and/or computing device 150. The one or more processors 104 can provide logic, circuitry, processing component and/or functionality for configuring, controlling and/or managing one or more operations of the computing device 150. For instance, a processor 104 may receive data and metrics, including but not limited to, power levels 110, measurements 112, ED thresholds 120, and/or transmit powers 122. In some embodiments, the processors 104 can include or correspond to a driver or host driver of the computing device 150 to execute or perform one or more portions of the processes or methods (e.g., method 400) described herein. The processor 104 can be the same as or similar to processing units 516 described above with respect to FIG. 5.

The computing device 150 can include a storage device 106. The storage device 106 can be designed or implemented to store, hold or maintain any type or form of data associated with the computing device 150. For example, the computing device 150 can store data associated with power levels 110, measurements 112, ED thresholds 120 and/or transmit power values 122. The storage device 106 can include a static random access memory (SRAM) or internal SRAM, internal to the computing device 150. In some embodiments, the storage device 106 can be included within an integrated circuit of the computing device 150. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 400) described herein. In some embodiments, the storage device 106 can include, be the same as or substantially similar to storage 518 of FIG. 5. The computing device 150 can include circuitry 108. The circuitry 108 can be a component of or part of computing system 514 described with respect to FIG. 5. In embodiments, the circuitry 108 can include a processor to perform all of or parts of method 400 described with respect to FIG. 4.

In some embodiments, the sensors 155 include electronic components or a combination of electronic components and software components that detect a location and an orientation of the computing device 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the computing device 150. In one aspect, the sensors 155 can detect the translational movement and the rotational movement with respect to a previous orientation and location of the computing device 150, and determine a new orientation and/or location of the computing device 150 by accumulating or integrating the detected translational movement and/or the rotational movement. Assuming for an example that the computing device 150 is oriented in a direction 25 degrees from a reference direction, in response to detecting that the computing device 150 has rotated 20 degrees, the sensors 155 may determine that the computing device 150 now faces or is oriented in a direction 45 degrees from the reference direction. Assuming for another example that the computing device 150 was located two feet away from a reference point in a first direction, in response to detecting that the computing device 150 has moved three feet in a second direction, the sensors 155 may determine that the computing device 150 is now located at a vector multiplication of the two feet in the first direction and the three feet in the second direction.

In some embodiments, the eye trackers 164 include electronic components or a combination of electronic components and software components that determine a gaze direction of the user of the computing device 150. In some embodiments, the eye trackers 164 include two eye trackers, where each eye tracker 164 captures an image of a corresponding eye and determines a gaze direction of the eye. In one example, the eye tracker 164 determines an angular rotation of the eye, a translation of the eye, a change in the torsion of the eye, and/or a change in shape of the eye, according to the captured image of the eye, and determines the relative gaze direction with respect to the computing device 150, according to the determined angular rotation, translation and the change in the torsion of the eye. In one approach, the eye tracker 164 may shine or project a predetermined reference or structured pattern on a portion of the eye, and capture an image of the eye to analyze the pattern projected on the portion of the eye to determine a relative gaze direction of the eye with respect to the computing device 150. In some embodiments, the eye trackers 164 incorporate the orientation of the computing device 150 and the relative gaze direction with respect to the computing device 150 to determine a gate direction of the user. Assuming for an example that the computing device 150 is oriented at a direction 30 degrees from a reference direction, and the relative gaze direction of the computing device 150 is −10 degrees (or 350 degrees) with respect to the computing device 150, the eye trackers 164 may determine that the gaze direction of the user is 20 degrees from the reference direction. In some embodiments, a user of the computing device 150 can configure the computing device 150 (e.g., via user settings) to enable or disable the eye trackers 164. In some embodiments, a user of the computing device 150 is prompted to enable or disable the eye trackers 164.

In some embodiments, the communication interface 165 includes an electronic component or a combination of an electronic component and a software component that communicates with the device 102. The communication interface 165 may communicate with a communication interface 115 of the device 102 through a communication link or communication channel. The communication channel may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the device 102 and the computing device 150 are implemented on a single system, the communication interface 165 may communicate with the device 102 through a bus connection or a conductive trace. Through the communication channel, the communication interface 165 may transmit to the device 102 sensor measurements indicating the determined location of the computing device 150 and the determined gaze direction of the user. Moreover, through the communication channel, the communication interface 165 may receive from the device 102 sensor measurements indicating or corresponding to an image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and can render the image through the electronic display 175. In some embodiments, the data from the device 102 may be encoded, and the image renderer 170 may decode the data to generate and render the image. In one aspect, the image renderer 170 receives the encoded image from the device 102, and decodes the encoded image, such that a communication bandwidth between the device 102 and the computing device 150 can be reduced. In one aspect, the process of detecting, by the computing device 150, the location and the orientation of the computing device 150 and/or the gaze direction of the user wearing the computing device 150, and generating and transmitting, by the device 102, a high resolution image (e.g., 1920 by 1080 pixels, or 2048 by 1152 pixels) corresponding to the detected location and the gaze direction to the computing device 150 may be computationally exhaustive and may not be performed within a frame time (e.g., less than 11 ms or 8 ms). In one aspect, the image renderer 170 generates one or more images through a shading process and a reprojection process when an image from the computing device 150 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the computing device 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

The channels 142 can include, but are not limited to, a communication channel, primary link, connection (e.g., wireless connection), and/or session (e.g., user and/or application session) established between the device 102 and one or more computing devices 150 and/or one or more other devices 150. The channels 142 links can be established using a communication protocol, including but not limited to, IEEE 802.11 based protocol, Bluetooth based protocol, WiFi based protocol, ultra wideband (UWB) protocol, or cellular based protocol. In embodiments, the channels 142 can include IEEE 802.11ay protocol or 802.11ax protocol. The device 102 and computing devices 150 can use the channels 142 to perform various communications, including but not limited to, data transfer for downlink operations, uplink operations and/or peer-to-peer transmissions between two or more computing devices 150 or two or more devices 102.

The device 102 and computing devices 150 can use the channels 142 to provide or support a full VR experience, AR experience or MR experience for a user of a computing device 150 or a device (e.g., head wearable display) connected to a computing device 150.

Figure 1B:
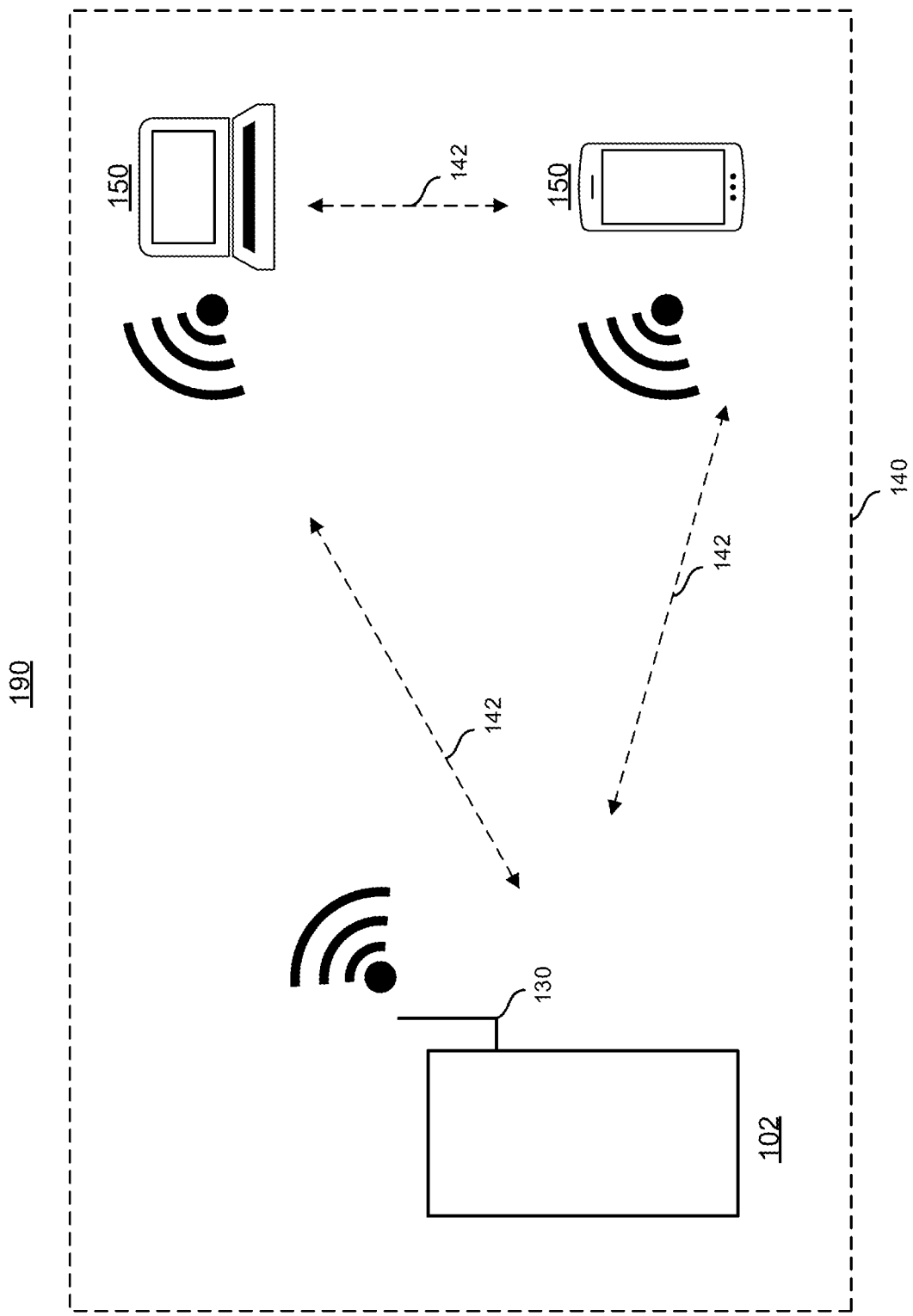
FIG. 1B is a diagram of a communication system, according to an example implementation of the present disclosure.

Now referring to FIG. 1B, a communication system 190 having a device 102 (e.g., access point) communicating with a plurality of computing devices 150 (e.g., STA devices) through a network 140. The device 102 can provide wireless communication coverage and/or act as a base station for the computing devices 150. The network 140 can include a determined area, neighborhood, and/or basic service area (BSA). The computing devices 150 can use the device 102 for communications referred to as a basic service set (BSS). In embodiments, the network 140 can include a single device 102 (e.g., central AP) or multiple devices 102 (e.g., multiple AP's). In some embodiments, the computing devices 150 can perform peer-to-peer communications and/or function as a peer-to-peer network independent of device 102 (e.g., without an AP). In embodiments, functions of the device 102 described herein can be performed by one or more of the computing devices 150. The computing devices 150 can include any type of computing device described herein, for example, the computing devices 150 may include, but are not limited to, a mobile device, a laptop, a sensor, HWD and/or any type of device capable of communicating using a wireless protocol. In embodiments, the computing devices 150 can provide VR applications, AR applications and/or MR applications to a user. The device 102 (e.g., AP device) can determine the status using at least one ED threshold 120 and/or threshold function 124 described herein of a channel for one or more STA devices 150, for example, for the STA devices 150 to communicate to the AP device 102 and/or for the STA devices 50 to communicate with other STA devices 150. The energy detection threshold techniques described herein can be applied to applications, including but not limited to, augmented reality (AR) applications and/or virtual reality (VR) applications.

Figure 2:
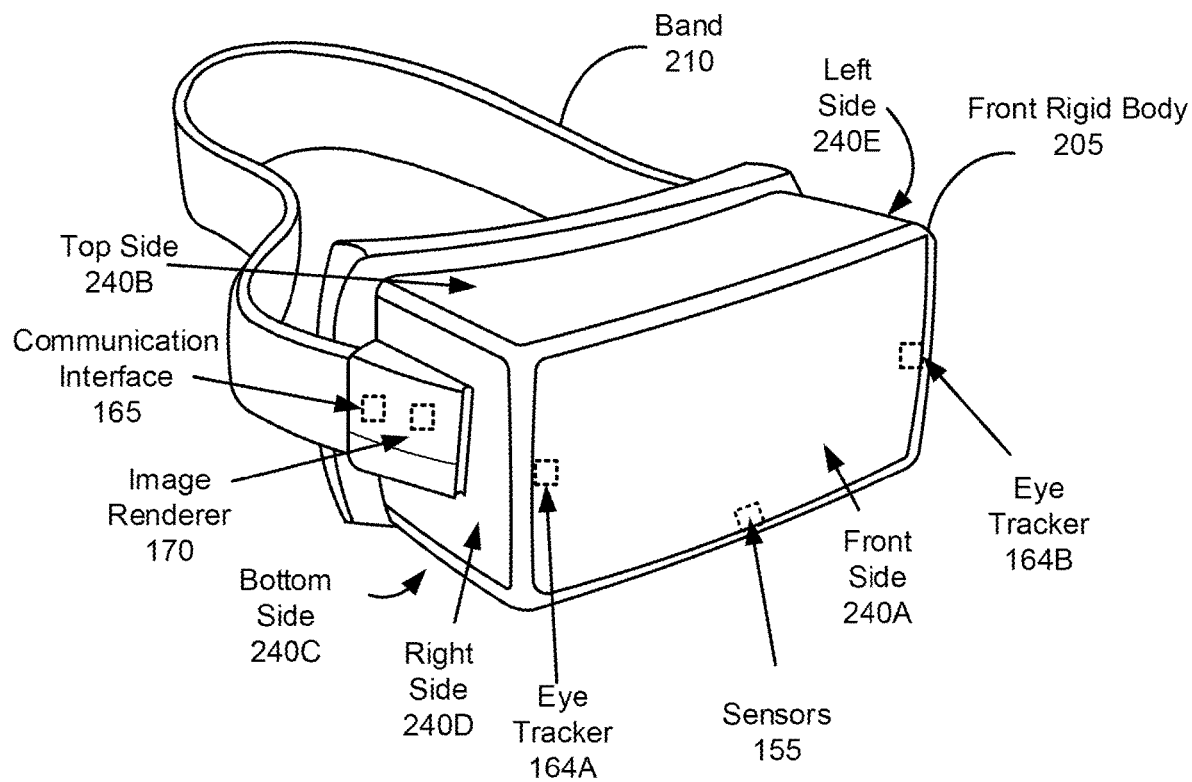
FIG. 2 is a diagram of a head wearable display, according to an example implementation of the present disclosure.

FIG. 2 is a diagram of an HWD device 150, in accordance with an example embodiment. In some embodiments, the HWD device 150 includes a front rigid body 205 and a band 210. The front rigid body 205 includes the electronic display 175 (not shown in FIG. 2), the lens 180 (not shown in FIG. 2), the sensors 155, the eye trackers 164A, 164B, the communication interface 165, and the image renderer 170. In the embodiment shown by FIG. 2, the sensors 155 are located within the front rigid body 205, and may not visible to the user. In other embodiments, the HWD device 150 has a different configuration than shown in FIG. 2. For example, the image renderer 170, the eye trackers 164A, 164B, and/or the sensors 155 may be in different locations than shown in FIG. 2.

Figure 3A:
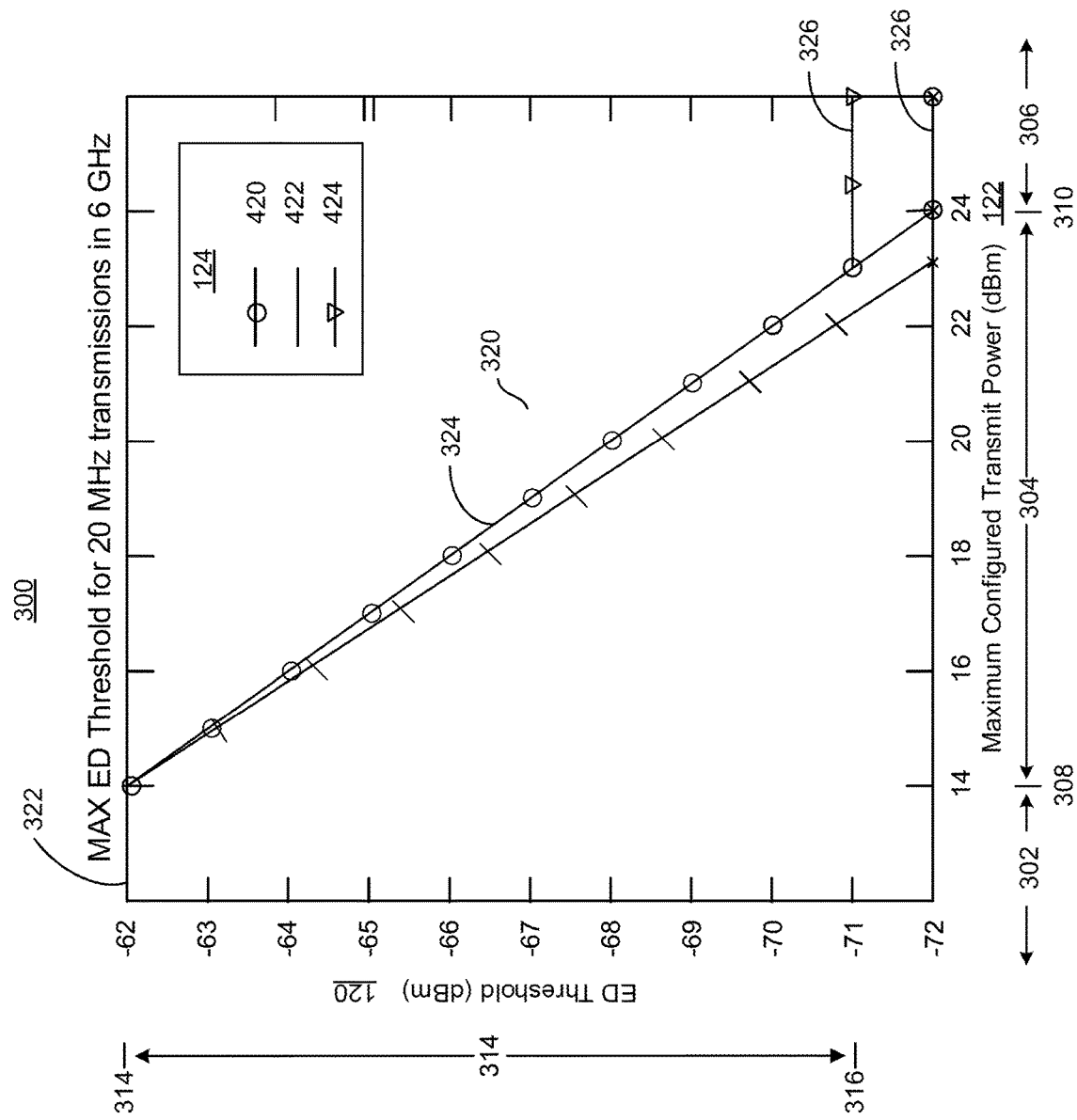
FIG. 3A is a first graph of multiple ED threshold functions covering multiple ranges of power levels, according to an example implementation of the present disclosure.

Now referring to FIG. 3A, a graph 300 illustrating the relationship between a determined value for an ED threshold 120 (e.g., y-axis, vertical axis) and a maximum transmit power 122 (e.g., x-axis, horizontal axis) for a device 102 (or computing device 150) is provided. The graph 300 can include three different threshold functions 124, and can illustrate the changes in the value of an ED threshold 120 as the transmit power 122 of a device 102 changes. In embodiments, the graph 300 can include a first ED threshold function 124 corresponding to operation (420) of method 400, a second ED threshold function 124 corresponding to operation (422) of method 400, and a third ED threshold function 124 corresponding to operation (424) of method 400 to executed by the device 102 to determine a value of an ED threshold 120 and apply to measurements 112 of a channel 142 to determine a status of the respective channel 142.

The value of the ED threshold 120 can include a continuous monotonic function 320 having a first region 322 covering a first range 302 of power levels, a sloped region 324 covering a second range 304 of power levels and a second region 326 covering a third range 306 of power levels. The first region 322 can include or cover the first range 302 of power levels for a transmit power 122 less than a first power threshold 308. For example, if the transmit power 122 of a device 102 is less than the first power threshold 308, the device 102 may use the first region 322 of the function 320 and the first constant value 312 as the ED threshold 120 for determining a status of a channel 142. The sloped region 324 can include or cover a second range 304 of power levels for a transmit power 122 greater than the first power threshold 308 and less than a second power threshold 310. In embodiments, if the transmit power 122 of a device 102 is greater than the first power threshold 308 and less than the second power threshold 310, the device 102 may use the sloped region 324 of the function 320 and the varying value 314 as the ED threshold 120 for determining a status of a channel 142. The second region 326 can include or cover a third range 306 of power levels for a transmit power 122 greater than the second power threshold 310. In embodiments, if the transmit power 122 of a device 102 is greater than the second power threshold 310, the device 102 may use the second region 326 of the function 320 and the second constant value 316 as the ED threshold 120 for determining a status of a channel 142.

The first region 322 can include, be assigned or correspond to the first constant value 312. The second region 326 can include, be assigned or correspond to the second constant value 316. The second constant value 316 can be different (e.g., less than, greater than) the first constant value 312. The sloped region 324 can include, be assigned or correspond to a varying value 314 that is a function of one of or a combination of the first constant value 312, the second constant value 316, a first power threshold 308, a second power threshold 310, and/or the transmit power 122 of the device 102. In embodiments, a gradient of the sloped region 324 can include a constant value. In one embodiment, the gradient of the sloped region can include a contestant value that varies based on a maximum transmit power 122 of a device 102 from the first constant value 312 to the second constant value 316.

The device 102 can determine a transmit power 122 of the device 102 attempting to access a channel 142, and use the transmit power 122 to determine an appropriate ED threshold 120 for determining if the channel 142 is occupied or unoccupied. In embodiments, if a transmit power 122 of a device 102 is less than the first power threshold 308, the first region 322 of the function 320 can apply and the device 102 can determine that the appropriate ED threshold 120 is the first constant value 312. In embodiments, if a transmit power 122 of a device 102 is greater than the first power threshold 308 and less than the second power threshold 310, the sloped region 324 of the function 320 can apply and the device 102 can determine that the appropriate ED threshold 120 is at least one value along the sloped region based in part on the transmit power 122 of the device 102. In embodiments, if a transmit power 122 of a device 102 is greater than the second power threshold 310, the second region 326 of the function 320 can apply and the device 102 can determine that the appropriate ED threshold 120 is the second constant value 316.

Figure 3B:
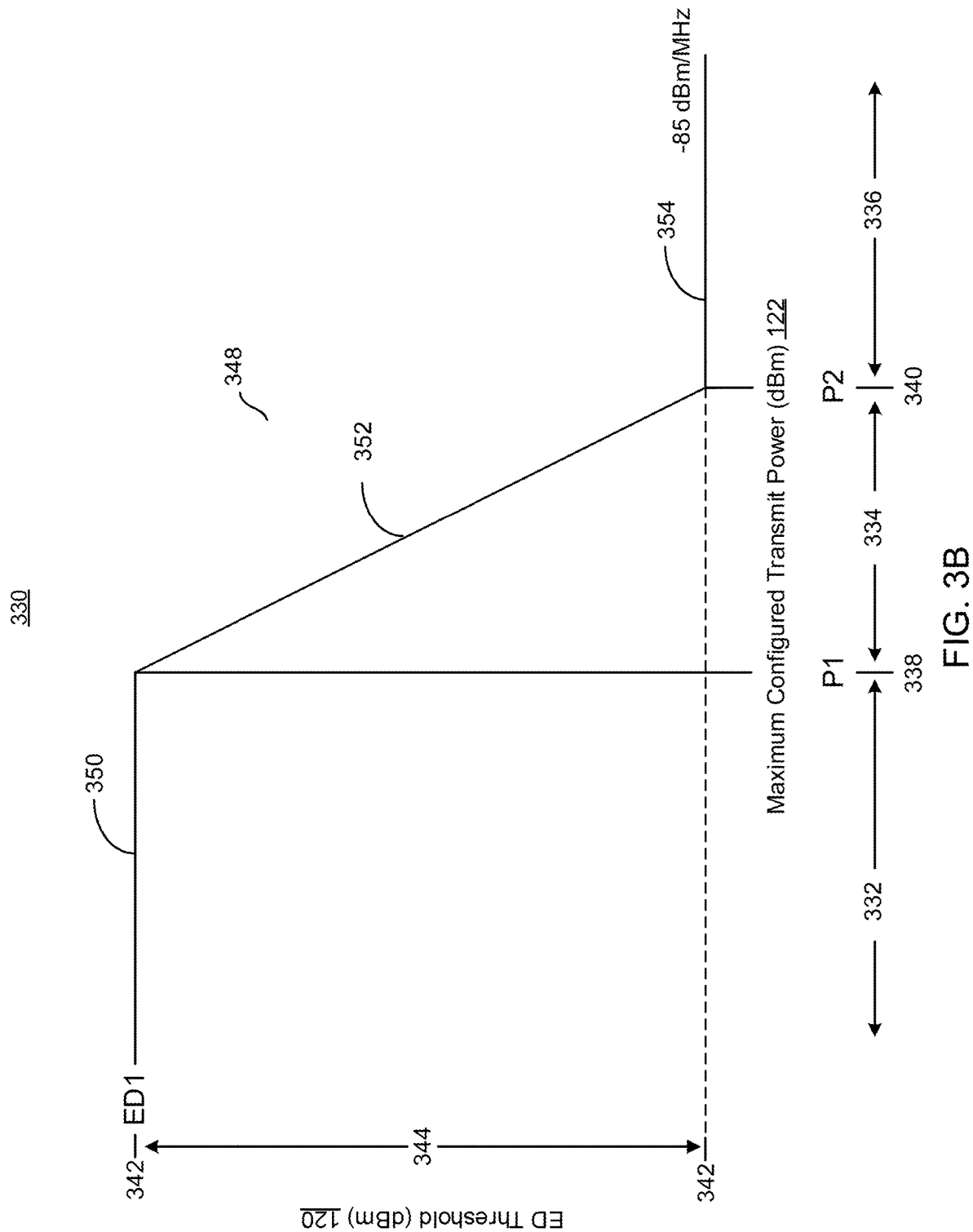
FIG. 3B is a second graph of an ED threshold function covering multiple ranges of power levels, according to an example implementation of the present disclosure.

Now referring to FIG. 3B, a graph 330 illustrating the relationship between a determined value for an ED threshold 120 (e.g., y-axis, vertical axis) and a maximum transmit power 122 (e.g., x-axis, horizontal axis) for a device 102 (or computing device 150) is provided. The graph 330 shows the changes in the value of an ED threshold 120 for different values of the transmit power 122 of one or more devices 102. In embodiments, graph 330 can include or correspond to at least one threshold function 124 (e.g., threshold function 124 from operation (428) of FIG. 4) executed by the device 102 to apply to measurements 112 of a channel 142 to determine a status of the respective channel 142.

The value of the ED threshold 120 can include a continuous monotonic function 348 having a first region 350 covering a first range 332 of power levels, a sloped region 352 covering a second range 334 of power levels and a second region 354 covering a third range 336 of power levels. The first region 350 can include or cover a first range 332 of power levels for a transmit power 122 less than a first power threshold 338. The sloped region 324 can include or cover a second range 334 of power levels for a transmit power 122 greater than the first power threshold 338 and less than a second power threshold 340. The second region 3354 can include or cover a third range 336 of power levels for a transmit power 122 greater than the second power threshold 340.

In embodiments, the first region 350 can include, be assigned or correspond to a first constant value 342. The second region 354 can include, be assigned or correspond to a second constant value 346. The second constant value 346 can be different (e.g., less than, greater than) the first constant value 342. The sloped region 352 can include, be assigned or correspond to a varying value 344 that is a function of one of or a combination of the first constant value 342, the second constant value 346, a first power threshold 338, a second power threshold 340, and/or the transmit power 122 of the device 102. In embodiments, a gradient of the sloped region 352 can include a constant value. In one embodiment, the gradient of the sloped region 352 can include a contestant value that varies based on a maximum transmit power 122 of a device 102 from the first constant value 342 to the second constant value 346. The continuous monotonic function 348 can include the sloped region 352 between the first region 350 having the first constant value 342 and the second region 354 having the second constant value 346. The sloped region 352 can have a gradient that is inversely proportional to a difference between a first value and a second value and the first value can be or represent an upper limit of the first range 332 of power levels and the second value can be a lower limit of the second range 334 of power levels.

In embodiments, if a transmit power 122 of a device 102 is less than the first power threshold 338, the first region 350 of the function 348 can apply and the device 102 can determine that the appropriate ED threshold 120 is the first constant value 342. In embodiments, if a transmit power 122 of a device 102 is greater than the first power threshold 338 and less than the second power threshold 340, the sloped region 352 of the function 348 can apply and the device 102 can determine that the appropriate ED threshold 120 is at least one value along the sloped region 352 based in part on the transmit power 122 of the device 102. In embodiments, if a transmit power 122 of a device 102 is greater than the second power threshold 340, the second region 354 of the function 348 can apply and the device 102 can determine that the appropriate ED threshold 120 is the second constant value 346.

Figure 3C:
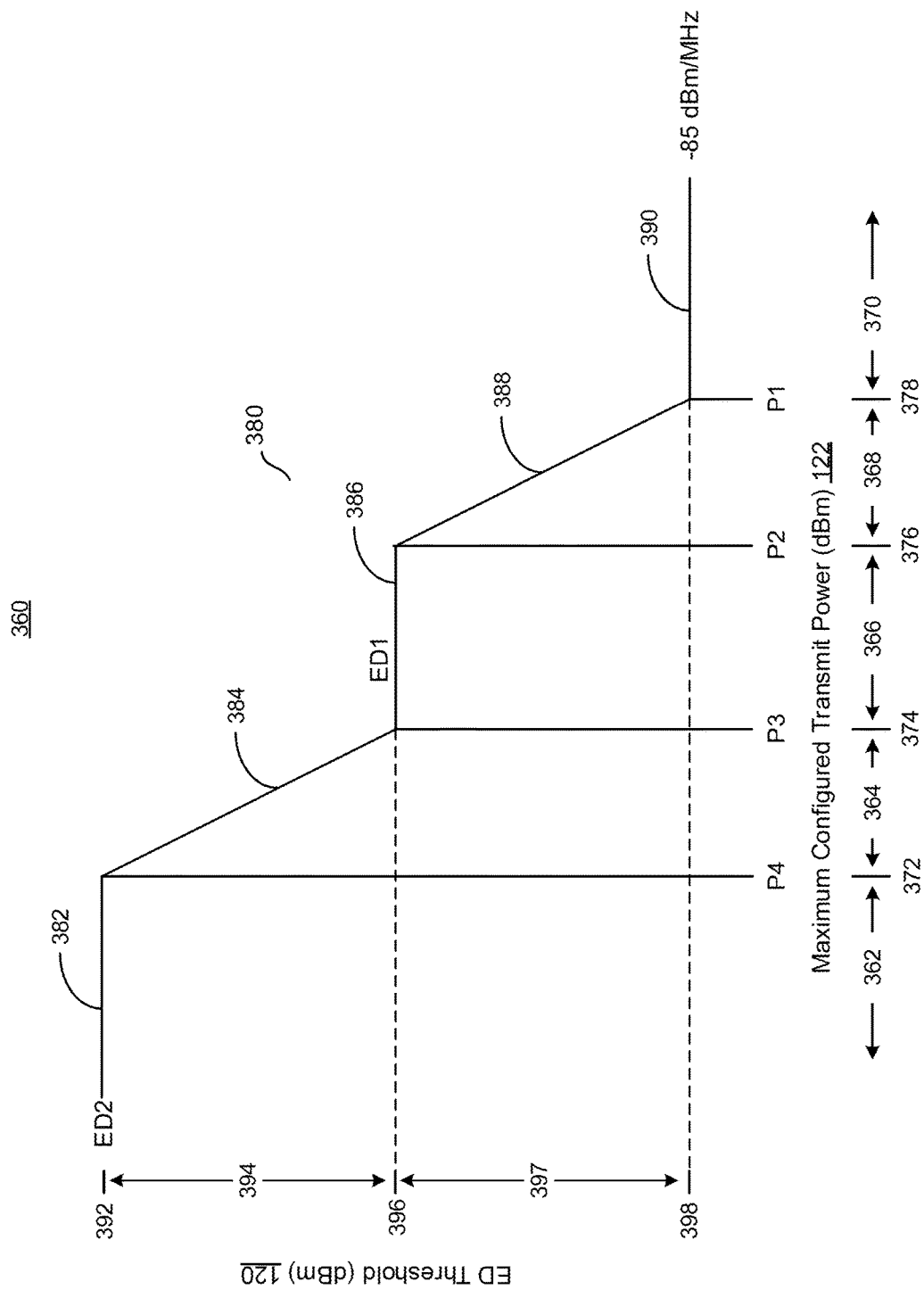
FIG. 3C is a third graph of an ED threshold function covering multiple ranges of power levels, according to an example implementation of the present disclosure.

Now referring to FIG. 3C, a graph 360 illustrating the relationship between a determined value for an ED threshold 120 (e.g., y-axis, vertical axis) and a maximum transmit power 122 (e.g., x-axis, horizontal axis) for a device 102 (or computing device 150) is provided. The graph 360 shows the changes in the value of an ED threshold 120 for different values of the transmit power 122 of one or more devices 102. In embodiments, graph 360 can include or correspond to at least one threshold function 124 (e.g., threshold function 124 from operation (430) of FIG. 4) executed by the device 102 to apply to measurements 112 of a channel 142 to determine a status of the respective channel 142.

The ED threshold 120 can include or correspond to a function 380 having multiple regions corresponding to multiple ranges of power levels. The function 380 can include a first region 382 covering a first range 362 of power levels for a transmit power 122 less than a first power threshold 372. The first region 382 can include or be assigned a first constant value 342. The function 380 can include a first sloped region 384 covering a second range 364 of power levels for a transmit power 122 greater than the first power threshold 372 and less than a second power threshold 374. The first sloped region 384 can include a varying value 394 that is a function of one of or a combination of the first constant value 392, the second constant value 396, the third constant value 398, the first power threshold 372, the second power threshold 374, and/or the transmit power 122 of the device 102. The function 380 can include a second region 386 covering a third range 366 of power levels for a transmit power 122 greater than the second power threshold 374 and less than a third power threshold 376. The second region 386 can include or be assigned a second constant value 396.

The function 380 can include a second sloped region 388 covering a fourth range 368 of power levels for a transmit power 122 greater than the third power threshold 376 and less than a fourth power threshold 378. The second sloped region 388 can include a varying value 397 that is a function of one of or a combination of the first constant value 392, the second constant value 396, the third constant value 398, the third power threshold 376, the fourth power threshold 378, and/or the transmit power 122 of the device 102. The function 380 can include a third region 390 covering a fifth range 370 of power levels for a transmit power 122 greater than the fourth power threshold 378. The third region 390 can include or be assigned a third constant value 398.

In embodiments, the continuous monotonic function 380 can include a first sloped region 384 between the first region 382 having a first constant value 392 and the second region 386 having a second constant value 396 and a second sloped region 388 between the second region 386 having the second constant value 396 and the third region 390 having a third constant value 398. In embodiments, the first sloped region 384 can have a gradient that is inversely proportional to a difference between a first value and a second value and the first value can be or represent an upper limit of the first range 362 or power levels and the second value can be a lower limit of the second range 364 of power levels. The second sloped region 388 can have a gradient that is inversely proportional to a difference between a third value and a fourth value and the third value can be or represent an upper limit of the third range 366 or power levels and the fourth value can be a lower limit of the fourth range 368 of power levels.

In embodiments, if a transmit power 122 of a device 102 is less than the first power threshold 372, the first region 382 of the function 380 can apply and the device 102 can determine that the appropriate ED threshold 120 is the first constant value 392. In embodiments, if a transmit power 122 of a device 102 is greater than the first power threshold 372 and less than the second power threshold 374, the first sloped region 384 of the function 380 can apply and the device 102 can determine that the appropriate ED threshold 120 is at least one value along the first sloped region 384 based in part on the transmit power 122 of the device 102. In embodiments, if a transmit power 122 of a device 102 is greater than the second power threshold 374 and less than a third power threshold 376, the second region 386 of the function 380 can apply and the device 102 can determine that the appropriate ED threshold 120 is the second constant value 396. In embodiments, if a transmit power 122 of a device 102 is greater than the third power threshold 376 and less than a fourth power threshold 378, the second sloped region 388 of the function 380 can apply and the device 102 can determine that the appropriate ED threshold 120 is at least one value along the second sloped region 388 based in part on the transmit power 122 of the device 102. In embodiments, if a transmit power 122 of a device 102 is greater than the fourth power threshold 378, the third region 390 of the function 380 can apply and the device 102 can determine that the appropriate ED threshold 120 is the third constant value 398.

Figure 4:
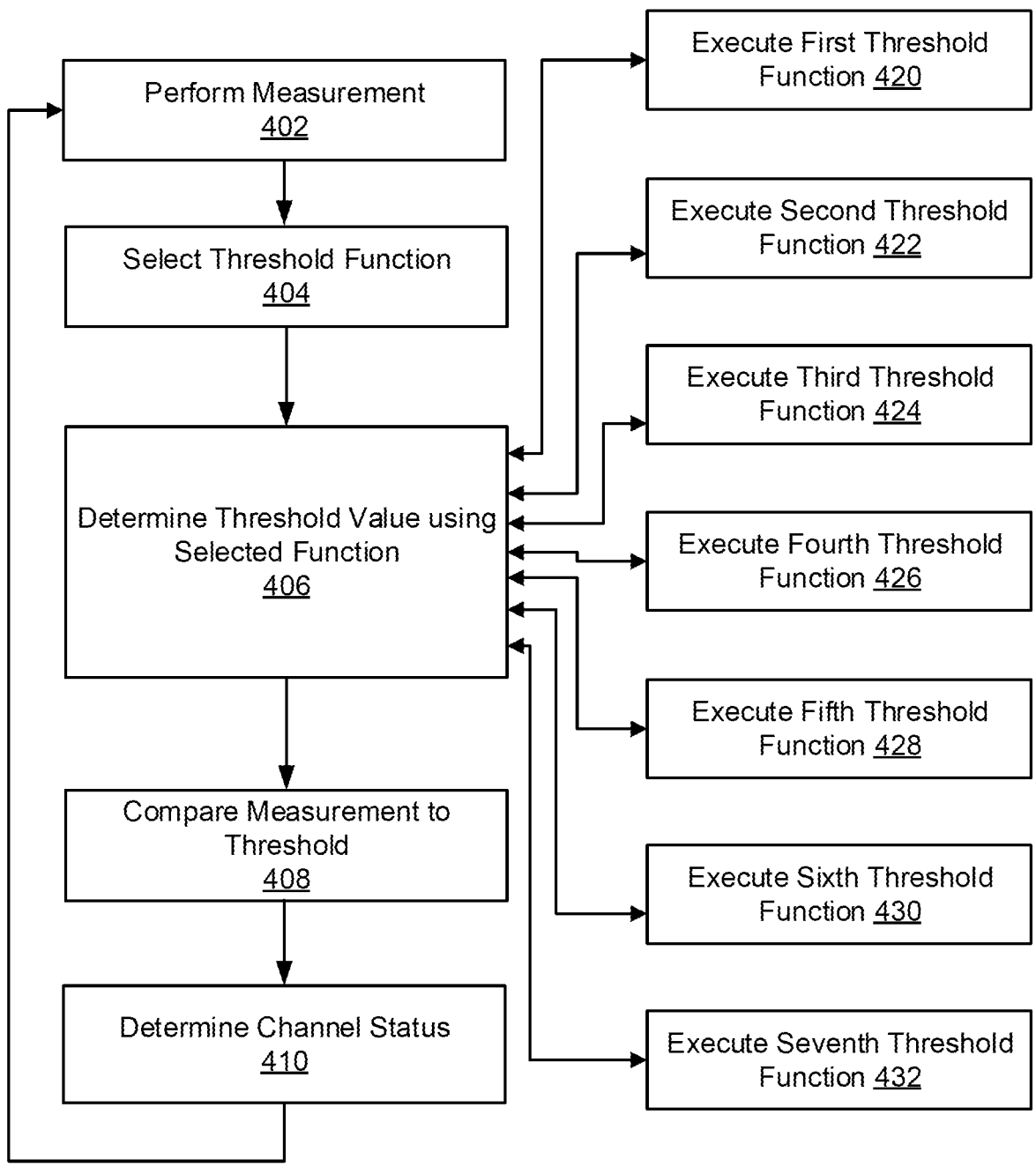
FIG. 4 is a flow chart illustrating a process or method for managing energy detection thresholds, according to an example implementation of the present disclosure.

Now referring to FIG. 4, a method 400 for managing energy detection thresholds is provided. In brief overview, the method 400 can include performing a measurement (402), selecting a threshold function (404), determining a threshold value (406), executing (e.g., applying) a first threshold function (420), executing a second threshold function (422), executing a third function (424), executing a fourth function (426), executing a fifth threshold function (428), executing a sixth threshold function (430), executing a seventh threshold function (432), comparing the measurement to the threshold (408), and determining a channel status (410). One or more of these operations may be performed by at least one processor and/or circuitry (e.g., processor 104, circuitry 108) of device 102 and/or a computing device 150. It should be appreciated that FIG. 4 is discussed from the viewpoint of device 102 determining a status of a channel 142, however method 400 may be performed by any device described herein including one or more computing devices 150.

At operation 402, and in some embodiments, a measurement 112 can be performed. A device 102 can perform a measurement 112 of a channel 142 indicative of a power level 110 of one or more signals detected in the channel 142. The device 102 can measure or determine power levels 110 of one or more channels 142 to determine if the channels 142 are occupied or unoccupied and/or available for communications between two or more devices 102. In embodiments, if no transmission is present in the channel 142 or if no transmission is present at a power level 110 greater than the ED threshold 120, the channel 142 can be considered, labeled or referred to as an unoccupied channel. If transmissions are present in the channel 142 at a power level 110 greater than the ED threshold 120, the channel 142 can be considered, labeled or referred to as an occupied channel.

The channel 142 can include a connection or session between multiple devices. In embodiments, the channel 142 can include a communications session (e.g., downlink transmissions, uplink transmissions) between a console (e.g., device 102) and one or more head wearable devices (e.g., device 150), for example, to provide content of artificial reality to the one or more head wearable devices. The device 102 can perform the measurement 112 for comparison against a selected ED threshold 120, and the ED threshold 120 can vary and be selected based at least in part on the channel 142 to be measured, a transmit power 122 of the device 102 performing the measurement, properties of a network 140 and/or properties of one or more devices 102 communicating through the channel 142. The device 102 can measure transmissions received through the channel 142 at the respective device 102 to determine a received power of the transmissions. In embodiments, the received power can be measured or determined at an interface between a device 102 (e.g., equipment) and an antenna assembly 130 of the device. For example, the received power can be measured or determined at an interface between a communications interface 115 of the device 102 (e.g., equipment) and an antenna assembly 130 connected to or communicating with the device 102. The device 102 can determine the power level 110 by integrating the received power over the channel 142 and normalizing the power to a per megahertz (MHz) power value.

At operation 404, and in some embodiments, a threshold function 124 can be selected to determine a threshold value for the measured channel 142 and device 102. The device 102 can include or execute multiple threshold functions 124 to apply to a plurality of channels 142 in a network 140 (e.g., basic service area (BSA), WiFi network) to determine a status of the respective channels 142. The device 102 can execute the threshold functions 124 to generate or determine a value for an ED threshold 120 that is proportional to a transmit power 122 (e.g., maximum transmit power) of the device 102. In embodiments, the device 102 can select a threshold function 124 from the plurality of threshold functions 124 based in part on a transmit power 122 value of at least one device 102, a type of device 102 (e.g., VLP device, non-VLP device), value of the measured power level 110, and/or properties of the network 140 (e.g., WiFi network, BSA). In embodiments, the device 102 can determine a transmit power 122 of the device 102 where the measurement 112 was performed and/or a transmit power 122 of at least one device 102 connected or communicating through the measure channel 142. The device 102 can use the transmit power 122 to select the threshold function 124. In some embodiments, the device 102 can determine a device type (e.g., VLP device, non-VLP device) of the device 102 where the measurement 112 was performed and/or a device type of at least one device 102 connected or communications communication through the measured channel 142. The transmit power 122 value can be used to determine the device type. The device 102 can use the transmit power 122 and the device type to select the threshold function 124.

At operation 406, and in some embodiments, a value for the threshold 120 can be determined. The device 102 can determine an ED threshold 120 to apply to a measured channel 142, for example, using the selected threshold function 124. The device 102 can apply the transmit power 122 to the selected threshold function 124 to determine the value of the ED threshold 120. In embodiments, the ED threshold 120 can be selected or determined to be proportional to an equipment's (e.g., device, console, HWD) maximum configured transmit power ($P_H$). In embodiments, if the first threshold function 124 is selected, the method 400 can go to (420) to execute the first threshold function 124 to determine the value for the ED threshold 120. The device 102 can select a second threshold function 124 and the method 400 can go to (422) to execute (e.g., apply) the second threshold function 124. The device 102 can select a third threshold function 124 and the method 400 can go to (424) to execute the third threshold function 124. The device 102 can select a fourth threshold function 124 and the method 400 can go to (426) to execute the fourth threshold function 124. The device 102 can select a fifth threshold function 124 and the method 400 can go to (428) to execute the fifth threshold function 124. The device 102 can select a sixth threshold function 124 and the method 400 can go to (430) to execute the sixth threshold function 124. The device 102 can select a seventh threshold function 124 and the method 400 can go to (432) to execute the seventh threshold function 124.

At operation 420, and in some embodiments, a first threshold function 124 can be executed to determine the value of an ED threshold 120. In embodiments, the device 102 can determine or select the first ED threshold function 124 that is a function having a different value based in part on the transmit power 122 for the respective device 102 and the function can include multiple regions (e.g., three regions) based in part on the determined transmit power 122 for the respective device 102. In embodiments, the first ED threshold function 124 can be similar to function 320 of FIG. 3A, however the values of the constant values and/or power thresholds may vary.

The first ED threshold function 124 can include a function having a first region that is a first constant value for a transit power 122 less than a first power threshold value, a second region that is a varying value or sloped region that corresponds to a sum or difference of a second constant value (e.g., negative second constant value) and the transmit power 122 for a transit power 122 greater than the first power threshold value and less than or equal to a second power threshold, and a third region that is the second constant value for transmit power values 122 greater than a second power threshold value. The first power threshold value can be different from the second power threshold value and the second constant value can be different from the first constant value. In embodiments, the sloped region can extend or slope from the first constant value to the second constant value over the second region. The value of the sloped region can include a function that is the sum of a selected second constant value added to a difference of a selected second transmit power 122 and the transmit power 122 of the device 102. Thus, the value of the sloped region can change in based in part on the transmit power 122 of the respective device 102.

In one embodiment, the function of the first ED threshold function 124 can be represented as follows:
First region: For $P_H \leq 14$ dBm: EDT=−[75] dBm/MHz.
Second region: For 14 dBm<$P_H \leq$[24] dBm: EDT=−85 dBm/MHz+([24] dBm−$P_H$).
Third region: For $P_H \geq$[24] dBm: EDT=−85 dBm/MHz.

Where $P_H$ represents the transmit power 122 of the device 102 and the EDT represents the ED threshold 120. The device 102 can execute the first ED threshold function 124 to determine the value of the ED threshold 120 and the method 400 can go to (408) to compare the power level measurement 112 to the ED threshold 120.

At operation 422, and in some embodiments, a second ED function 124 can be executed. The device 102 can determine or select the second ED threshold function 124 that is a function having a different value based in part on the transmit power 122 for a respective device 102 and can include a function having multiple regions (e.g., three regions). In embodiments, the second ED threshold function 124 can be similar to function 320 of FIG. 3A, however the values of the constant values and/or power thresholds may vary.

The second ED threshold function 124 can include a function having a first region that is a first constant value for a transit power 122 less than a first power threshold value, a second region that is a varying value or sloped region that corresponds to a sum or difference of a second constant value (e.g., negative second constant value) and a product of a fraction value and the transmit power 122 for a transit power 122 greater than the first power threshold value and less than or equal to a second power threshold, and a third region that is the second constant value for transmit power values 122 greater than the second power threshold value. The first power threshold value can be different from the second power threshold value and the second constant value can be different from the first constant value. In embodiments, the sloped region can extend or slope from the first constant value to the second constant value over the second region. In embodiments, the second ED threshold function 124 can be similar to the first ED threshold function 124, however the second or sloped region can include a different function to generate a different value for the ED threshold 120 based in part on the provided transmit power 122 of the device 102. The value of the sloped region can include a function that is the sum of a selected second constant value added to a product of a fraction value (e.g., 10/9) and a difference of a selected second transmit power 122 and the transmit power 122 of the device 102 (e.g., B+10/9*(Y−$P_H$)). Thus, the value of the sloped region can change in based in part on the transmit power 122 of the respective device 102.

In one embodiment, the function of the second ED threshold function 124 can be represented as follows:
First region: For $P_H \leq 14$ dBm: EDT=−[75] dBm/MHz.
Second region: For 14 dBm<$P_H \leq$[23] dBm: EDT=−85 dBm/MHz+10/9*([23] dBm−$P_H$).
Third region: For $P_H \geq$[23] dBm: EDT=−85 dBm/MHz.

The device 102 can execute the second ED threshold function 124 to determine the value of the ED threshold 120 and the method 400 can go to (408) to compare the power level measurement 112 to the ED threshold 120.

At operation 424, and in some embodiments, a third ED threshold function 124 can be executed. In embodiments, the device 102 can determine or select a third ED threshold function 124 that is a function having a different value based in part on the transmit power 122 for a respective device 102 and the function 124 can include multiple regions (e.g., three regions). In embodiments, the third ED threshold function 124 can be similar to function 320 of FIG. 3A, however the values of the constant values and/or power thresholds may vary.

The third ED threshold function 124 can include a function having a first region that is a first constant value for a transit power 122 less than a first power threshold value, a second region that is a varying value or sloped region that corresponds to a sum or difference of a second constant value (e.g., negative second constant value) and the difference between the second power threshold and the transmit power 122 for the device 102 for a transit power 122 greater than the first power threshold value and less than or equal to the second power threshold, and a third region that is the second constant value for transmit power values 122 greater than the second power threshold value. The second power threshold value can be different from the first power threshold value and the second constant value can be different from the first constant value. The sloped region can extend or slope from the first constant value to the second constant value over the second region.

In embodiments, the third ED threshold function 124 can be similar to the first ED threshold function 124, however the second or sloped region of the third ED threshold function 124 can include a different second constant value and/or different second power threshold to generate a different value for the ED threshold 120 based in part on the provided transmit power 122 of the device 102. The value of the sloped region can include a function that is the sum of the selected second constant value added to a difference between the second power threshold and the transmit power 122 of the device 102. Thus, the value of the sloped region can change in based in part on the transmit power 122 of the respective device 102.

In one embodiment, the function of the third ED threshold function 124 can be represented as follows:

First region: For $P_H \leq 14$ dBm: EDT=−[75] dBm/MHz
Second region: For 14 dBm<$P_H \leq$[23] dBm: EDT=−84 dBm/MHz+([23] dBm−$P_H$)
Third region: For $P_H \geq$[23] dBm: EDT=−84 dBm/MHz The device 102 can execute the third ED threshold function 124 to determine the value of the ED threshold 120 and the method 400 can go to (408) to compare the power level measurement 112 to the ED threshold 120.

At operation 426, and in some embodiments, a fourth ED threshold function 124 can be executed. In embodiments, the device 102 can determine or select a fourth ED threshold function 124 that is a function having a different value based in part on the transmit power 122 for a respective device 102 and can include a function having multiple regions (e.g., two regions). For example, the fourth ED threshold function 124 can include a function having a first region that includes a varying value or sloped region having a value equal to the sum or difference of a constant value and a difference between a power variable and the transmit power 122 for the device 102 for transmit power values 122 less than or equal to the power variable and a second region that is equal to the constant value for transmit power values 122 greater than the power variable. The value of the first or sloped region can include a function that is the sum of the selected constant value added to a difference between the power variable value and the transmit power 122 of the device 102. Thus, the value of the first region or sloped region can change in based in part on the transmit power 122 of the respective device 102.

In one embodiment, the function of the fourth ED threshold function 124 can be represented as follows:

First region: For $P_H \leq$[P1] dBm: EDT=−85 dBm/MHz+ ([P1] dBm−$P_H$).
Second region: For $P_H >$[P1] dBm: EDT=−85 dBm/MHz.

In some embodiments, the value of the variable P1 can be set to the 24 dBm. The device 102 can execute the fourth ED threshold function 124 to determine the value of the ED threshold 120 and the method 400 can go to (408) to compare the power level measurement 112 to the ED threshold 120.

At operation 428, and in some embodiments, a fifth ED threshold function 124 can be executed. In embodiments, the device 102 can determine or select a fifth ED threshold function 124 that is a function having a different value based in part on the transmit power 122 for a respective device 102 and can include a function having multiple regions (e.g., three regions). In embodiments, the fifth ED threshold function 124 can be similar to function 348 of FIG. 3B, however the values of the constant values and/or power thresholds may vary.

The fifth ED threshold function 124 can include a function having a first region that is equal to a first constant value for transmit power values 122 less than or equal to a second power variable (e.g., second power variable, different power variable from fourth ED threshold function 124), and a second region having a varying value or sloped region having a value corresponding to a second constant value, a power variable, the first constant value, a second power variable, and the transmit power 122 of the respective device 102 for transmit power values 122 greater than the second power variable and less than or equal to the first power variable, and a third region that is equal to the second constant value for transmit power values 122 greater than the first power variable. In embodiments, the second region can have a varying value or sloped region that is equal to a difference between the second constant value and the first power variable multiplied by a difference between the second constant value and the first constant value divided by the difference between the first power variable and the second power variable added to a difference between the second constant value and the first constant value divided by the difference between the first power variable and the second power variable multiplied by the transmit power 122 of the device 102. The value of the second region of the fifth ED threshold function 124 can vary based in part on the transmit power 122 of the device 102, the selected constant values and/or the selected power variables.

In embodiments, the first region can cover a first range of power levels and the second region can cover a second range of power levels, and the sloped region can have a gradient that is inversely proportional to a difference between a first value (e.g., first constant value) and a second value (e.g., second constant value). The first value can be an upper limit of the first range and the second value can be a lower limit of the second range. The gradient of the sloped region can include or correspond to a constant value. The device 102 can determine the ED threshold 120 according to the function of the sloped region, for example, the when the maximum transmit power 122 of the device 102 is within a range of the sloped region. The device 102 can apply the transmit power 122 of the device 102 to the ranges of power levels or values represented by or correspond by the ED threshold function 124. In embodiments, the device 102 can determine that the maximum transmit power 122 of the device 102 falls within or is included in the range of power levels covered by the sloped region of the ED threshold function 124. In one embodiment, the maximum transmit power 122 of the device 102 can be greater than a first power threshold value and less than a second power threshold value with a range of power levels from the first power threshold value to the second power threshold value corresponding to the range of power levels covered by the sloped region of the ED threshold function 124. The device 102 can apply the maximum transmit power 122 of the device 102 to the sloped region of the ED threshold function 124 to determine or generate the value of the ED threshold 120 corresponding to the maximum transmit power 122 of the device 102.

In embodiments, the device 102 can determine that the ED threshold 120 can be a first constant value when the maximum transmit power 122 of the device 102 is within a first range of a first region of power levels covered by the ED threshold function 124 and that the threshold can be a second constant value when the maximum transmit power 122 of the device 102 is within a second range of a second region of power levels covered by the ED threshold function 124. The device 102 can apply the transmit power 122 of the device 102 to the ranges of power levels represented by or correspond by the ED threshold 120 and determine that the maximum transmit power 122 of the device 102 falls within or is included in the range of power levels corresponding to a first constant value or a second constant value. In one embodiment, the maximum transmit power 122 of the device 102 can be less than a first power threshold value assigned to a first region of power levels of the ED threshold 120 and the device 102 can determine that the ED threshold 120 is the first constant value. In one embodiment, the maximum transmit power 122 of the device 102 can be greater than a second power threshold value assigned to a second region of power levels of the ED threshold 120 and the device 102 can determine that the ED threshold 120 for is the second constant value.

In one embodiment, the fifth ED threshold function 124 can be represented as follows:

First region: For $P_H \leq P2$ dBm: EDT=[ED1] dBm/MHz.
Second, region: For P2 dBm<$P_H \leq$[P1] dBm: EDT=−85−P1*(−85−ED1)/(P1−P2)+(−85−ED1)/(P1−P2)*$P_H$.
Third region: For $P_H$>[P1] dBm: EDT=−85 dBm/MHz Where P1 and P2 represent first and second power variables respectively and ED1 represents a selected constant value. The device 102 can execute the fifth ED threshold function 124 to determine the value of the ED threshold 120 and the method 400 can go to (408) to compare the power level measurement 112 to the ED threshold 120.

At operation 430, and in some embodiments, a sixth ED threshold function 124 can be executed. In embodiments, the device 102 can determine or select a sixth ED threshold 120 that is a function having a different value based in part on the transmit power 122 for a respective device 102. The sixth threshold function 124 can include a function having multiple regions (e.g., five regions) based in part on the determined transmit power 122 for the respective device 102. In embodiments, the sixth ED threshold function 124 can be similar to function 380 of FIG. 3C, however the values of the constant values and/or power thresholds may vary.

In embodiments, the sixth ED threshold function 120 can include a continuous monotonic function having a second sloped region between the second region having the second constant value and a third region having a third constant value. The second region can cover a first range of power levels and the third region can cover a second range of power levels. The second sloped region can have a gradient that is inversely proportional to a difference between a first value and a second value. The first value can be an upper limit of the first range and the second value can be a lower limit of the second range. In some embodiments, the sixth ED threshold function 124 can include five regions of power levels including at least two sloped regions. The sixth ED threshold function can include a first region can include a first range of power levels, the second region can include a first sloped region covering a second range of power levels, a third region can cover a third range of power levels, a fourth region can include a second sloped region covering a fourth range of power levels, and a fifth region can cover a fifth range of power levels. The device 102 can apply the maximum transmit power 122 to the sixth ED threshold function 124 to determine which region of the ED threshold 120 the maximum transmit power 122 of the device 102 falls within. The device 102 can use the corresponding region to determine the value of the ED threshold 120 for the maximum transmit power 122 of the device 102, including a constant value or a varying value corresponding to the first sloped region or the second sloped region.

The sixth ED threshold function 124 can include a function having a first region that is equal to a second constant value for a transmit power 122 less than or equal to a fourth power variable. The sixth ED threshold function 124 can include a second region having a varying value or sloped region having a value corresponding to the second constant value, the fourth power variable, a first constant value, a third power variable, and the transmit power 122 of the respective device 102 for transmit power values 122 greater than the fourth power variable and less than or equal to the third power variable. In one embodiment, the second region can include a function having a value that is equal to the second constant value minus the fourth power variable multiplied by the difference of the second constant value and the first constant value divided by a difference of the fourth power variable and the third power variable added to the difference of the second constant value and the first constant value divided by the difference of the fourth power variable and the third power variable multiplied by the transmit power 122 for the respective device 102. The sixth ED threshold function 124 can include a third region that is equal to the first constant value for a transmit power 122 greater than the third power variable and less than or equal to a second power variable.

The sixth ED threshold function 124 can include a fourth region having a varying value or sloped region having a value corresponding to a third constant value, a first power variable, the first constant value, the second power variable, and the transmit power 122 of the respective device 102 for transmit power values 122 greater than the second power variable and less than or equal to the first power variable. In one embodiment, the fourth region can include a function having a value that is equal to the third constant value minus the first power variable multiplied by the difference of the third constant value and the first constant value divided by a difference of the first power variable and the second power variable added to the difference of the third constant value and the first constant value divided by the difference of the first power variable and the second power variable multiplied by the transmit power 122 for the respective device 102. The sixth ED threshold function 124 can include a fifth region that is equal to the third constant value for a transmit power 122 greater than the first power variable.

In one embodiment, the sixth ED threshold function 124 can be represented as follows:

First region: For $P_H \leq P4$ dBm: EDT=[ED2] dBm/MHz.
Second region: For P4 dBm<$P_H \leq$P3 dBm: EDT=ED2−P4*(ED2−ED1)/(P4−P3)+(ED2−ED1)/(P4−P3)*$P_H$.
Third region: For P3 dBm<$P_H \leq$[P2] dBm: EDT=[ED1] dBm/MHz.
Fourth region: For P2 dBm<$P_H \leq$[P1] dBm: EDT=−85−P1*(−85−ED1)/(P1−P2)+(−85−ED1)/(P1−P2)*$P_H$.
Fifth region: For $P_H$>[P1] dBm: EDT=−85 dBm/MHz.

Where P1, P2, P3, and P4 represent first, second, third and fourth power variables respectively and ED1 and ED2 represent different selected constant values respectively. The device 102 can execute the sixth ED threshold function 124 to determine the value of the ED threshold 120 and the method 400 can go to (408) to compare the power level measurement 112 to the ED threshold 120.

At operation 432, and in some embodiments, a seventh ED threshold function 124 can be executed. The device 102 can determine or select a seventh ED threshold function 124 based in part on a number of VLP devices 102 and/or VLP devices 150 available or within a determined range or area of the device 102. The device 102 can determine or select the ED threshold 120 to correspond to, be based in part on or depend on a number of low power (e.g., VLP) devices 102 and/or VLP devices 150 available in a determined range or network 140 (e.g., wireless network, BSA, neighborhood). In embodiments, the ED threshold function 124 can be selected based at least in part on one or more other devices 102 within a determined range of the device 102 where the channel measurement occurred and the device types of the one or more other devices 102. The device 102 can include a very low power (VLP) device and the device 102 can be within a range of other VLP devices 102 (or devices 150), and the device 102 can set the value of the ED threshold 120 as a function of a product of the maximum transmit power 122 of the device 102 and a first threshold, and a product of the maximum transmit power 122 of the device 102 and a second threshold. The first threshold can be less than the second threshold. In embodiments, low power devices 102 (or devices 150) can include devices that have a transmit power value less than or equal to 14 dBm.

The device 102 (e.g., access point (AP) device) can announce a percentage (p) of low power devices 102 and/or devices 150 that are in determined range. In embodiments for low transmissions (e.g., low modulation and coding selection (MCS) transmissions) by lower power devices 102 (e.g., VLP DUT), the seventh ED threshold function 124 can be a function of two or multiple ED thresholds 120. For example, the seventh ED threshold function 124 can be determined or selected to be function having a value equal to a sum of a power variable multiplied by a first ED threshold 120 (e.g., ED_low) and a constant value (e.g., 1) minus the power variable multiplied by a second ED threshold 120 (e.g., ED_high). In one embodiments, the seventh ED threshold function 124 can be represented as follows:

$$ED\ threshold = p*(ED\_low) + (1-p)*(ED\_high).$$

The first ED threshold 120 and second ED threshold 120 can be determined based in part on a power level of the transmissions. In one embodiment for 20 MHz transmissions, the first ED threshold 120 (e.g., ED_low) can be equal to −72 dBm and the second ED threshold 120 (e.g., ED_high) can be equal to −52 dBm.

In one embodiment, the formula for the first ED threshold 120 (e.g., ED_low) for 20 MHz transmissions can be represented as follows:

ED_low can be computed by the formula: −85 dBm+ 10*log 10(20)=−72 dBm.

In one embodiment, the formula for the second ED threshold 120 (e.g., ED_high) for 20 MHz transmissions can be represented as follows:

ED_high can be computed by the formula −65 dBm+ 10*log 10(20)=52 dBm.

The device 102 can execute the seventh ED threshold function 124 to determine the value of the ED threshold 120 and the method 400 can go to (408) to compare the power level measurement 112 to the ED threshold 120.

At operation 408, and in some embodiments, the measurement 112 can be compared to the threshold 120. The device 402 can compare the measurement 112 to the ED threshold 120 that is determined, for example, using the selected threshold function 124. The device 102 can execute the selected ED threshold function 124 to determine the ED threshold 120. In embodiments, the threshold functions 124 can provide or generate multiple ED threshold 120 values with each of the different ED threshold 120 values assigned to or corresponding to a different transmit power 122 or different range of transmit power 122 values. For example, the ED threshold 120 can have a first value for a first range of transmit power 122 values (e.g., $P_H$ less than a first power threshold value), a second value for a second range of transmit power 122 values (e.g., e.g., $P_H$ between the first power threshold value and a second power threshold), and a third value for a third range of transmit power 122 values (e.g., $P_H$ greater than the second power threshold value). The number of values and ranges of transmit power 122 values included in an ED threshold 120 can vary (e.g., single value, two or more values, three value, five values) based in part on the threshold function 124 selected. The device 102 can use the transmit power 122 of the device 102 to determine the appropriate ED threshold 120 value.

The device 102 can compare the measurement 112 of the power level 110 of the channel 142 to the ED threshold 120. In embodiments, the device 102 can compare the measurement 112 to an ED threshold 120 having a value that is a continuous monotonic function having a sloped region between a first region having a first constant value and a second region having a second constant value. The sloped region can include a function of a maximum transmit power 122 of the device 102 and at least one of the first constant value or the second constant value.

At operation 410, and in some embodiments, a channel status can be determined. The device 102 can determine a channel status of the respective channel 142. In embodiments, the device 102 can determine, responsive to the comparison, whether the channel 142 is occupied or unoccupied. The device 102 can determine, responsive to the power level 110 being greater than the ED threshold 120, that the channel 142 is occupied and unavailable for the device 102 to access for communications. In embodiments, if the channel is occupied or unavailable, the device 102 can select a next channel 142 to determine the status of and use for communications via the device 102. The method 400 can return to (402) to perform a measurement. The device 102 can determine, responsive to the power level 110 being less than ED threshold 120, that the channel 142 is unoccupied and available for the device 102 to access for communications. The device 102 may initiate, enable or allow communications (e.g., transmit, receive) via the device 102 using the channel 142 determined to be unoccupied. In embodiments, method 400 can return to (402) to perform a measurement of a next channel 142 for the device 102 and/or a different device 102 of the network 140.

Figure 5:
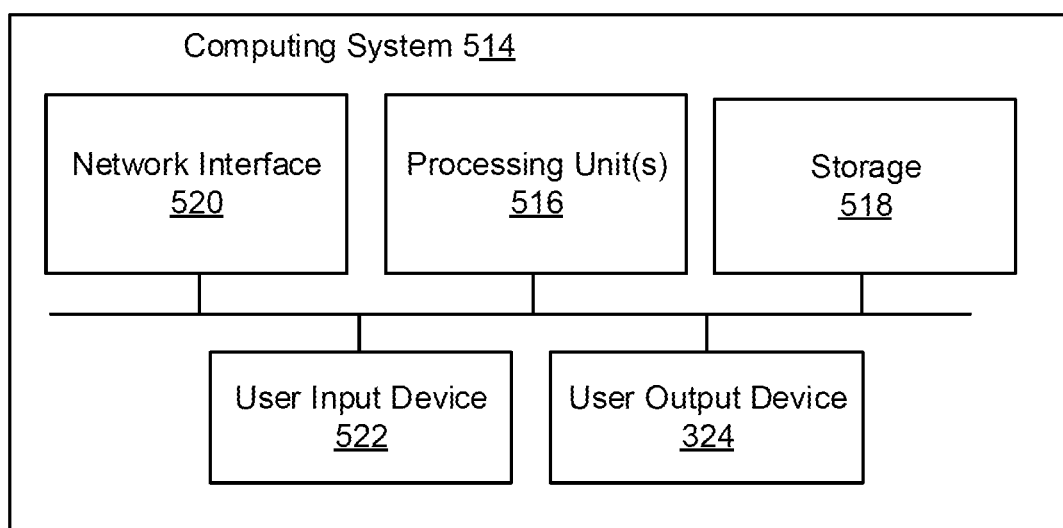
FIG. 5 is a block diagram of a computing environment according to an example implementation of the present disclosure.

Various operations described herein can be implemented on computer systems. FIG. 5 shows a block diagram of a representative computing system 514 usable to implement the present disclosure. In some embodiments, the device 102, computing device 150 or both of FIGS. 1A-1B are implemented by the computing system 514. Computing system 514 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 514 can be implemented to provide VR, AR, MR experience. In some embodiments, the computing system 514 can include conventional computer components such as processors 516, storage device 518, network interface 520, user input device 522, and user output device 524.

Network interface 520 can provide a connection to a wide area network (e.g., the Internet) to which WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   performing, by a device, a measurement of a channel indicative of a power level of one or more signals detected in the channel;
   comparing, by the device, the measurement to a threshold having a value that is a continuous monotonic function having a sloped region between a first region having a first constant value and a second region having a second constant value, the first region covering a first range of power levels and the second region covering a second range of power levels, the sloped region comprising a function of a maximum transmit power of the device and at least one of the first constant value or the second constant value, the sloped region having a gradient that is inversely proportional to a difference between a first value and a second value, wherein the first value is an upper limit of the first range and the second value is a lower limit of the second range; and
   determining, by the device responsive to the comparison, whether the channel is occupied or unoccupied.

2. The method of claim 1, comprising:
   determining, by the device responsive to the power level being greater than the threshold, that the channel is occupied and unavailable for the device to access for communications.

3. The method of claim 1, comprising:
   determining, by the device responsive to the power level being less than the threshold, that the channel is unoccupied and available for the device to access for communications.

4. The method of claim 1, comprising:
    determining, by the device, the threshold according to the function of the sloped region, when the maximum transmit power of the device is within a range of the sloped region.

5. The method of claim 1, comprising:
    determining, by the device, that the threshold is the first constant value when the maximum transmit power of the device is within a first range of the first region, and that the threshold is the second constant value when the maximum transmit power of the device is within a second range of the second region.

6. The method of claim 1, wherein a gradient of the sloped region is a constant value.

7. The method of claim 1, wherein the continuous monotonic function comprises a second sloped region between the second region having the second constant value and a third region having a third constant value.

8. The method of claim 7, wherein the second region covers a first range of power levels and the third region covers a second range of power levels, and the second sloped region has a gradient that is inversely proportional to a difference between a first value and a second value, wherein the first value is an upper limit of the first range and the second value is a lower limit of the second range.

9. The method of claim 1, wherein the device includes a very low power (VLP) device and the device is within a range of other VLP devices, and the method comprises setting the value of the threshold as a function of a product of the maximum transmit power of the device and a first threshold, and a product of the maximum transmit power of the device and a second threshold.

10. A device comprising:
    one or more processors configured to:
        perform a measurement of a channel indicative of a power level of one or more signals detected in the channel;
        compare the measurement to a threshold having a value that is a continuous monotonic function having a sloped region between a first region having a first constant value and a second region having a second constant value, the first region covering a first range of power levels and the second region covering a second range of power levels, the sloped region comprising a function of a maximum transmit power of the device and at least one of the first constant value or the second constant value, the sloped region having a gradient that is inversely proportional to a difference between a first value and a second value, wherein the first value is an upper limit of the first range and the second value is a lower limit of the second range; and
        determine, responsive to the comparison, whether the channel is occupied or unoccupied.

11. The device of claim 10, wherein the one or more processors are configured to:
    determine, responsive to the power level being greater than the threshold, that the channel is occupied and unavailable for the device to access for communications; and
    determine, responsive to the power level being less than the threshold, that the channel is unoccupied and available for the device to access for communications.

12. The device of claim 10, wherein the one or more processors are configured to:
    determine the threshold according to the function of the sloped region, when the maximum transmit power of the device is within a range of the sloped region.

13. The device of claim 10, wherein the one or more processors are configured to:
    determine that the threshold is the first constant value when the maximum transmit power of the device is within a first range of the first region, and that the threshold is the second constant value when the maximum transmit power of the device is within a second range of the second region.

14. The device of claim 10, wherein a gradient of the sloped region is a constant value.

15. The device of claim 10, wherein the continuous monotonic function comprises a second sloped region between the second region having the second constant value and a third region having a third constant value, the second region covers a first range of power levels and the third region covers a second range of power levels, and the second sloped region has a gradient that is inversely proportional to a difference between a first value and a second value, and wherein the first value is an upper limit of the first range and the second value is a lower limit of the second range.

16. The device of claim 10, wherein the device includes at least one of a mobile terminal, user equipment or device, access point or base station.

17. A non-transitory computer readable medium storing instructions when executed by one or more processors cause the one or more processors to:
    perform a measurement of a channel indicative of a power level of one or more signals detected in the channel;
    compare the measurement to a threshold having a value that is a continuous monotonic function having a sloped region between a first region having a first constant value and a second region having a second constant value, the first region covering a first range of power levels and the second region covering a second range of power levels, the sloped region comprising a function of a maximum transmit power of the device and at least one of the first constant value or the second constant value, the sloped region having a gradient that is inversely proportional to a difference between a first value and a second value, wherein the first value is an upper limit of the first range and the second value is a lower limit of the second range; and
    determine, responsive to the comparison, whether the channel is occupied or unoccupied.

* * * * *